United States Patent
Tobita et al.

(10) Patent No.: US 6,914,890 B1
(45) Date of Patent: Jul. 5, 2005

(54) APPARATUS, AND ASSOCIATED METHOD, FOR SEQUENCING TRANSMISSION OF DATA

(75) Inventors: Hiroshi Tobita, Yokohama (JP); Mickael Deboille, Helsinki (FI); Pekko Orava, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/369,221

(22) Filed: Aug. 5, 1999

(51) Int. Cl.$^7$ .............................................. H04Q 7/24
(52) U.S. Cl. .................. 370/338; 370/352; 370/331; 370/348; 370/465; 370/468; 370/353; 370/354; 370/337
(58) Field of Search ................................ 370/338, 347, 370/348, 337, 352, 353, 354, 445, 465, 331, 468, 322

(56) References Cited

U.S. PATENT DOCUMENTS

| 5,319,641 | A | * | 6/1994 | Fridrich et al. ............ 370/85.3 |
| 5,386,412 | A | * | 1/1995 | Park et al. ..................... 370/53 |
| 5,533,019 | A | * | 7/1996 | Jayapalan .................. 370/60.1 |
| 5,572,546 | A | | 11/1996 | Serfaty et al. .............. 375/221 |
| 5,610,595 | A | * | 3/1997 | Garabrant et al. ..... 340/825.52 |
| 5,912,921 | A | | 6/1999 | Warren et al. .............. 375/220 |
| 5,991,286 | A | * | 11/1999 | Labonte et al. ............. 370/337 |
| 6,233,230 | B1 | * | 5/2001 | Chan .......................... 370/335 |
| 6,246,670 | B1 | * | 6/2001 | Karlsson et al. ............ 370/244 |
| 6,327,256 | B1 | * | 12/2001 | Paivike et al. .............. 370/337 |

* cited by examiner

*Primary Examiner*—Edward F. Urban
*Assistant Examiner*—Marceau Milord

(57) ABSTRACT

Apparatus, and an associated method, for selecting the sequence in which frames of data are communicated in a multi-user, multi-rate, radio communication system. Data that is to be communicated at higher transmission rates to certain users is selected to be sequenced prior to transmission of data to be transmitted at lower transmission rates to other users. Polling is performed to determine at what transmission rates that data is to be communicated with individual ones of the users. And, an ordered sequence is formed. The ordered sequence defines sequencing of the transmission of data.

18 Claims, 3 Drawing Sheets

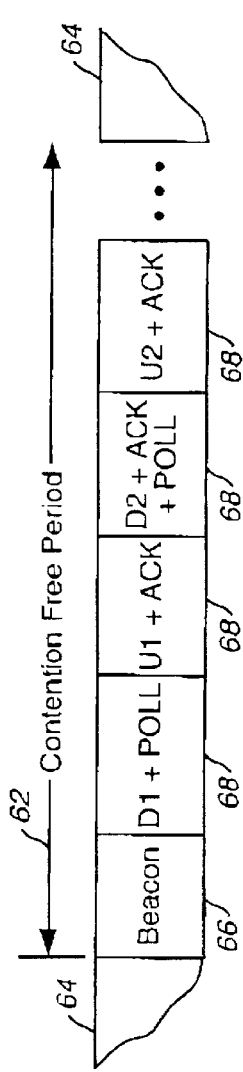
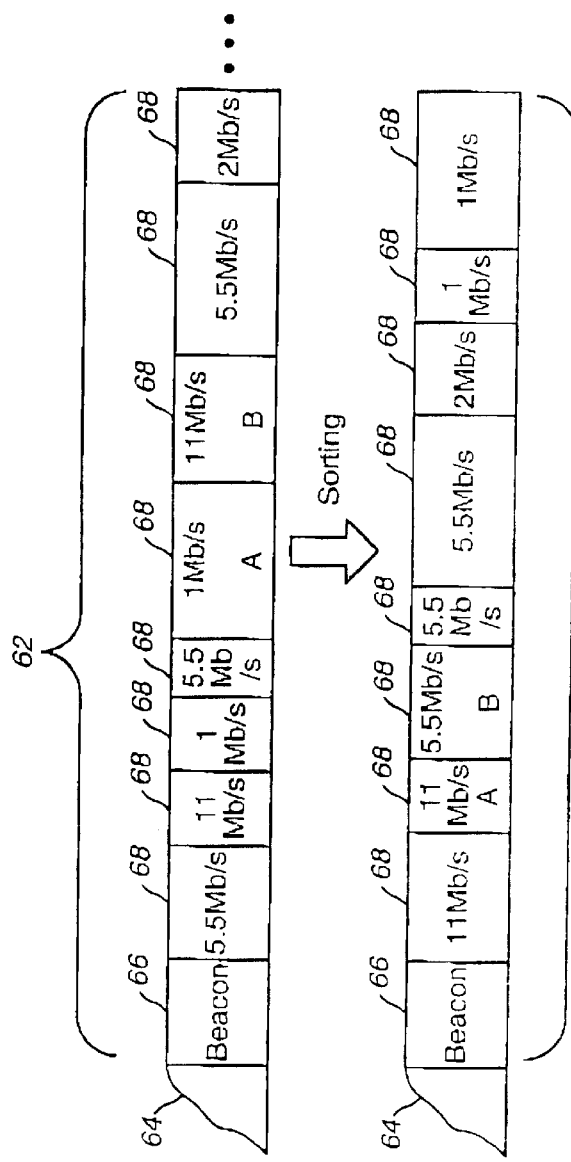
FIG. 2
FIG. 3

APPARATUS, AND ASSOCIATED METHOD, FOR SEQUENCING TRANSMISSION OF DATA

The present invention relates generally to communications in a multi-rate capable radio communication system, such as a WLAN (wireless local area network), in which receipt of data is acknowledged with an acknowledgment indication. More particularly, the present invention relates to apparatus, and an associated method, by which to sort groups, e.g., frames, of data according to the transmission rate at which the data is to be communicated. In an exemplary implementation, data that is to be communicated at higher transmission rates is sorted to be sent prior to data which is to be communicated at lower transmission rates. Acknowledgment indications "piggy-backed" together with other data is thereby better able to be detected.

BACKGROUND OF THE INVENTION

Advancements in communication technologies have permitted the introduction, and popularization, of new types of communication systems. As a result of such advancements, the rate of data transmission and the corresponding amount of data permitted to be communicated in such communication systems, has increased relative to existing types of communication systems.

A radio communication system is representative of a type of communication system which has benefited from advancements in communication technologies. Because radio-links are utilized to form communication channels in a radio communication system, increased communication mobility relative to conventional wireline communication systems is generally possible.

Bandwidth limitations, however, sometimes limit the communication capacity of the radio communication system. That is to say, generally, only a limited amount of the electromagnetic spectrum is allocated to usage by a particular radio communication system. When the communication capacity is limited by the bandwidth allocated to the radio communication system, an increase in communication capacity requires more efficient utilization of the allocated bandwidth.

Use of digital communication techniques, for instance, provides a manner by which to increase the bandwidth efficiency of communications in a communication system. The use of such digital techniques is particularly advantageously utilized in a radio communication system due to the particular need to efficiently utilize the bandwidth allocated in such a system.

Typically, when utilizing digital communication techniques, information which is to be communicated is digitized to form digital bits. In one technique, the digitized bits are formatted into sequences which form packets of which one or more packets sometimes together form a frame. The terms packet and frame shall be, at times, used interchangeably herein to refer to data which is to be communicated. Because the sequences of the data forming the packets or frames can be communicated at discrete intervals and thereafter concatenated together to recreate the informational content of the data.

Because packets or frames of data can be communicated at discrete intervals, a frequency band need not be dedicated solely for the communication of data generated by one sending station or transmission to one receiving station as conventionally required in analog communications. Instead, the frequency band can be shared amongst a plurality of different sending and receiving station-pairs. Because the same frequency band can be utilized to effectuate communications by the plurality of pairs of communication stations, improved communication capacity is possible.

Packet data communications are effectuated, for instance, in conventional LANs (local area networks). Wireless networks, operable in manners analogous to wired LANs, referred to as WLANs (wireless local area networks) have also been developed and are utilized to communicate data over a radio-link.

The IEEE (Institute of Electrical and Electronic Engineers) 802.11 specification sets forth, inter alia, the standards of operation of an exemplary WLAN. The system set forth in the standard provides for multi-user communications. Data is formatted into frames and sent over a radio-link. Once received, an acknowledgment indication is returned to indicate reception of the frame.

The IEEE 802.11 standard, as presently-promulgated, defines a contention period (CP) and a contention free period (CFP). The contention period defines a random access period during which any sending station is permitted random access to communicate a frame of data. And, the contention free period data is permitted to be communicated responsive to a polling procedure in which allocations are made as to when a sending station is permitted to communicate a frame of data.

Conventionally, subsequent to reception of a frame of data, an acknowledgment indication is returned to the sending station from which the frame is sent. A manner is set forth by which an acknowledgment indication to a frame of data is returned during transmission of a subsequent frame of data. The acknowledgment indication is said to "piggyback" upon the subsequent frame of data. Through such a process, the overhead otherwise required to generate acknowledgment control frames is obviated.

When each frame of data is transmitted at the same transmission rate, the acknowledgment indications are returned at the same transmission rate at which the initially-transmitted frame was transmitted. However, the system set forth in the IEEE 802.11 standard provides for multi-rate communications. That is to say, separate communication sessions within a single contention free period are able to be effectuated at different transmission rates. The transmission rates at which a communication session is effectuated, is dependent, for instance, upon hardware capabilities of the mobile terminal involved in the communication session communication channel characteristics, or other considerations.

A problem occurs, though, when the acknowledgment indication responsive to a frame of data is sent at a higher transmission rate than that at which a mobile terminal is operable. That is to say, when a sending station operable to transmit and to receive at a relatively low transmission rate receives an acknowledgment indication transmitted at a high transmission rate, detection of the acknowledgment indication might be missed.

Therefore, a manner by which better to assure that an acknowledgment indication is detectable in a multi-user, multi-rate communication scheme is needed.

It is in light of this background information related to multi-rate, multi-user communication systems that the significant improvements of the present invention have evolved.

SUMMARY OF THE INVENTION

The present invention, accordingly, advantageously provides apparatus, and an associated method, which sorts groups of data which are to be communicated in a multi-user, multi-rate communication system. By sorting the data according to the transmission rates at which the data is to be communicated, better assurances are provided that acknowledgment indications acknowledging receipt of data is successfully returned to an originating station from which the data originates.

In one aspect of the present invention, frames of data which are to be communicated pursuant to a plurality of different communication sessions during a non-random-access time period are sorted according to the transmission rates at which each of the plurality of frames are to be transmitted. Frames of data which are to be transmitted at higher transmission rates are sequenced to be transmitted within the non-random-access time period prior to transmission of frames which are to be transmitted at lower transmission rates. By sequencing the frames of data in this manner, acknowledgment indications generated to acknowledge receipt of a previously-transmitted frame of data are better assured to be detectable. That is to say, a manner is provided, through operation of an embodiment of the present invention, by which to ensure that the acknowledgment shall be received correctly by a message-sending terminal operable in a mixed data rate environment.

An embodiment of the present invention is operable in any of various communication systems. In the exemplary implementation, an embodiment of the present invention is operable in a WLAN (wireless local area network) constructed pursuant to the IEEE 802.11 standard, as presently-promulgated. As set forth in the standard for WLAN activity at a MAC (medium access control) layer, acknowledgment indications are added to a transmitted frame of data is added to a subsequent data frame in a "piggy-back" manner during a contention free period (CFP). Operation of an embodiment of the present invention provides a manner by which to ensure that an acknowledgment indication shall not be non-detectable at a mobile terminal due to the operability of the mobile terminal at only a lower transmission rate.

In one implementation, an access point (AP) forming a portion of the network infrastructure of the WLAN controls frame sequencing and transmission during a contention free period (CFP). The frames of data are sorted in descending order, according to the bit rate, thereby to ensure that an acknowledgment indication, "piggy-backed" upon a subsequent frame, shall be transmitted at a transmission rate equal to, or less than, the transmission rate at which the original frame of data is transmitted.

The advantages provided by the ability to utilize multiple data transfer rate capabilities set forth in the IEEE 802.11 standard are thereby provided while also providing a manner by which to manage mobile terminals and transmission of data therewith in a mixed data rate environment.

In these and other aspects, therefore, apparatus, and an associated method, is provided for a radio communication system having a network infrastructure with which a first mobile terminal and at least a second mobile terminal communicates data in a time division communication scheme. Reception of data is acknowledged by an acknowledgment feedback communication. Data to be communicated between the network infrastructure and the first mobile terminal is selected to be communicated at a first data rate. And, the data to be communicated between the network infrastructure and the second mobile terminal is selected to be communicated at a second data rate. The communication sequence of communication of the data with the first mobile terminal and the at least second mobile terminal is controlled. A selector is coupled to receive indications of the data rate at which the data communicated between the network infrastructure and the first mobile terminal and between the network infrastructure and the second mobile terminal are selected to be communicated. The selector selects the communication sequence of the communication of the data according to a sequencing scheme. The sequencing scheme orders the sequence of the communication of the data responsive to the transmission rates at which the data is selected to be communicated between the network infrastructure and each of the mobile terminals.

A more complete appreciation of the present invention and the scope thereof can be obtained from the accompanying drawings which are briefly summarized below, the following detailed description of the presently-preferred embodiment of the invention, and the appended claims.

BRIEF DESCRIPTION OF THE DRAWINGS

FIG. 2 illustrates a portion of a contention free period (CFP) defined by the communication system shown in FIG. 1.

FIG. 3 illustrates portions of a contention free period (CFP) before and after sorting operations performed during operation of an embodiment of the present invention.

DETAILED DESCRIPTION OF THE PREFERRED EMBODIMENT

Figure 1:
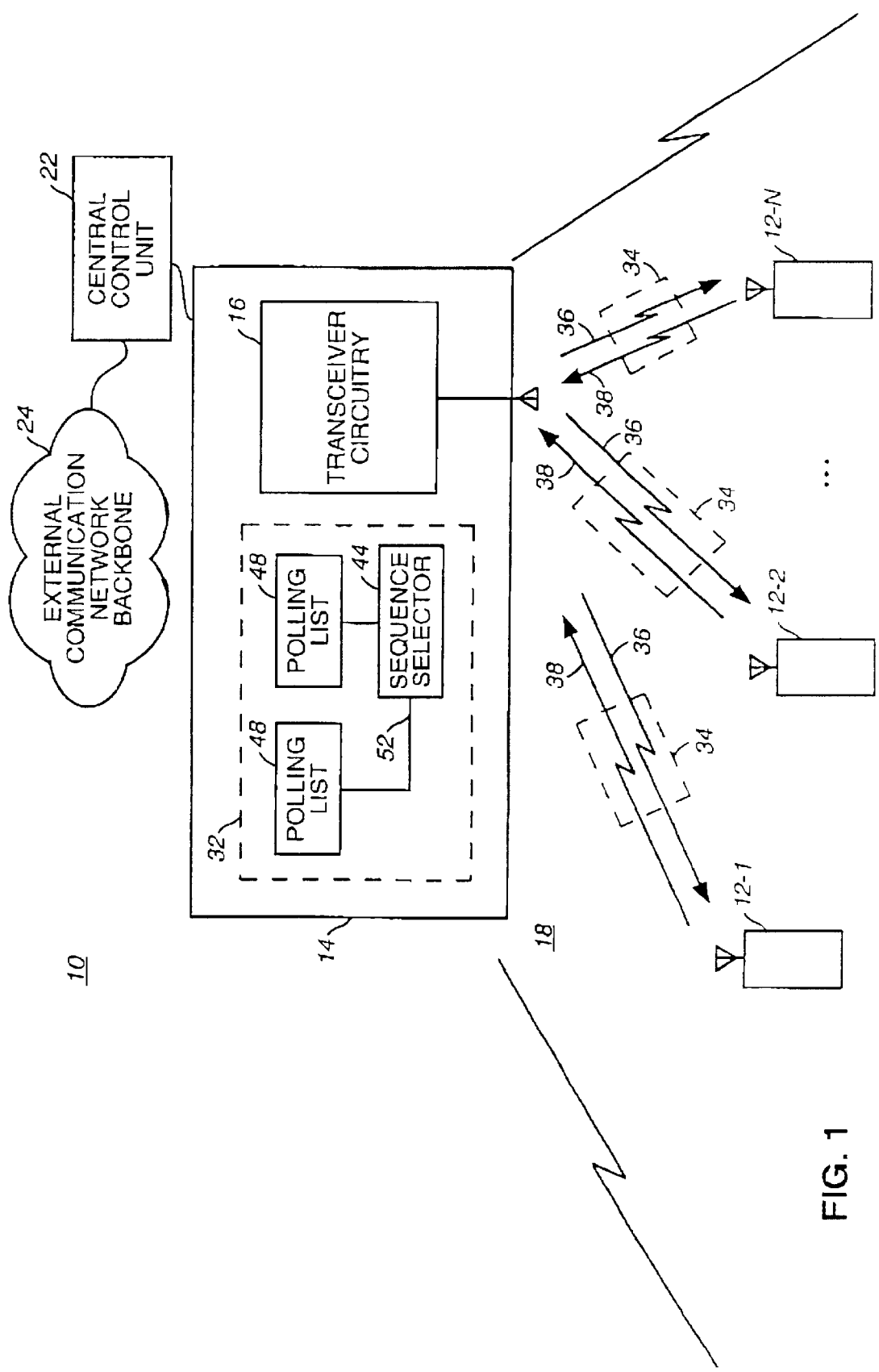
FIG. 1 illustrates a functional block diagram of a communication system in which an embodiment of the present invention is operable.

Referring first to FIG. 1, a communication system, shown generally at 10, provides for radio communications with mobile terminals 12-1 through 12-N. In the exemplary implementation, the communication system 10 forms a WLAN (wireless local area network) which provides for radio communications with the mobile terminals in the manners such as those defined in the IEEE 802.11 standard, as presently-promulgated. Other embodiments of the present invention are analogously operable in other types of radio communication systems. Other communication systems can analogously be represented, and operation of other embodiments of the present invention are analogously also operable in such other communication systems.

In conventional manner, the WLAN of which the communication system 10 is formed includes a plurality of spaced-apart access points (APs) 14, of which a single access point is shown in the Figure. Typically, in an actual WLAN, a plurality of access points are utilized. In some implementations, the access points 14 are referred to as base stations or RADs (remote antenna devices). The term "access point" shall generally be used herein to identify such devices as such terms utilized in the aforementioned IEEE 802.11 standard.

The access point 14 as shown in the Figure, as well as others, include radio transceiver circuitry 16 capable of transceiving radio communication signals with mobile terminals when the mobile terminals are positioned within an area, here referred to as a cell 18, proximate to, and defined by, the access point. In the exemplary illustration of the Figure, each of the mobile terminals 12-1 through 12-N are positioned within the cell 18 defined by the access point 14 shown in the Figure.

The access point 14 is shown to be coupled to a central control unit (CCU) 22. Other access points, not shown in the Figure, are similarly also coupled to the central control unit. The central control unit is operable, inter alia, to perform control functions to control various aspects of operation of the WLAN. The central control unit is further coupled to an external communication network backbone 24. While not separately shown, other communication devices, such as other communication stations and other communication networks are typically coupled to the network backbone 24. Communications are thereby able to be effectuated between a mobile terminal 12 and a communication station coupled to the communication network backbone 24. Because of the multi-user nature of the communication system, a plurality of seemingly-concurrent communications can be effectuated between a plurality of mobile terminals 12-1 through 12-N and a corresponding number of communication stations. Communications can also be effectuated between pairs of the mobile terminals 12-1 through 12-N.

The access point 14 includes control apparatus 32 of an embodiment of the present invention. The control apparatus is operable, inter alia, to control sequencing of communications between the access point 14 and mobile terminals 12-1 through 12-N over radio-links 34 which include both forward links 36 and reverse links 38. Here, the control apparatus 32 is shown to include a sequence selector 44, and first and second polling lists 46 and 48. The elements shown to form portions of the control apparatus 32 are functional in nature and can be implemented in any of various manners. In the exemplary implementation the functional elements form algorithms executable by processing circuitry. In other implementations, the functions performed by such elements are implemented in other manners. And, when implemented in the logical architecture set forth in the IEEE 802.11 standard, the functions performed by the control apparatus 32 form a portion of the MAC (medium access control) layer and provide the functionality of the point coordination function (PCF) defined therein.

Through operation of the control apparatus 32, mobile terminals 12-1 through 12-N operable to transmit and to receive frames of data are sequenced in a manner to ensure that acknowledgment indications generated responsive to prior transmission of the frame of data shall be detectable.

The mobile terminals communicate with the access point 14 and provide the access point with indications of the transmission rate capabilities of the respective mobile terminals. For instance, during the association, a mobile terminal might identify itself to have a transmission rate capability of 1, 2, and 5.5 Mb/s while another mobile terminal might identify itself to have a transmission rate capability of only 1 Mb/s. That is to say, different mobile terminals are operable at different transmission rates due to hardware limitations of the respective mobile terminals. Communicate channel conditions might, however, cause a terminal to be able to communicate at only a reduced rate relative to its stated rate. In one implementation, the access point maintains information related to transmission rate capabilities of the mobile terminals together with channel condition reduction.

The polling list 46 includes listings of each of the mobile terminals 12-1 through 12-N positioned within the cell 18, or otherwise registered therein. The mobile terminals identified in the polling list are polled during a contention free period (CFP) to determine whether the respective mobile terminals have data which is to be transmitted. As set forth in the IEEE 802.11 standard, the polling is performed by a point coordination function (PCF).

Such transmission rate information is provided to the sequence selector 44. The sequence selector is operable responsive to such detection to create an ordered sequence, here forming a second polling list 48, by which to permit communications with the respective mobile terminals during the contention free period. In the exemplary implementation the sequence selector 44 orders a sequence of frame transmissions in which mobile terminals operable at higher transmission rates are first effectuated, prior to effectuation of communications with mobile terminals operable at lower transmission rates. By sequencing the communications in this manner, acknowledgment indications, piggy-backed upon subsequent frames of data are assured to be communicated at a transmission rate no higher than the transmission rate at which the mobile terminal is operable. Problems associated with inability of a mobile terminal to detect an acknowledgment indication due to operability of the mobile terminal at a transmission rate lower than that at which the feedback acknowledgment is generated is thereby avoided. In the exemplary implementation, the PCF function set forth in the 802.11 standard is altered by the addition of an additional polling list in which a frame sorting function performed by the sequence selector 44 effectuates the frame sequencing selection. While the polling lists 46 and 48 are functionally illustrated to be separated, a single list may instead be utilized.

In one implementation, the mobile terminals are identified by identifiers and the listing of the mobile terminals is sorted by the transmission rates of the respective mobile terminals. The listing contains the identifiers also to permit the access point to perform polling operations to inquire whether respective ones of the mobile terminals have data which is to be communicated.

In one implementation, the mobile terminals also are able to transmit different types of frames at different transmission rates. In such an implementation, the listing identifies the frames to be transmitted and sorts the frames by their respective transmission rates.

FIG. 2 illustrates portions of a contention free period (CFP), such as that defined in the IEEE 802.11 standard. As set forth in the standard, the CFP is defined to be a period during which random access of communications between the mobile terminals 12-1 through 12-N is not permitted. During the CFP, the access point 14 determines which mobile terminals are permitted to transmit data. A point coordinator (PC) is implemented at the access point to perform the function of a polling master to make such a determination. During the CFP 62, the point coordinator function of the access point 14 inquires of each mobile terminal listed in the polling list 46 as to whether data is to be communicated by the mobile terminal. In this manner, the access point controls communications within the cell 18 during the contention free period.

The CFP 62 is bordered by contention periods (CPs) 64 in which random access to the communication channels by the mobile terminals is permitted. As set forth in the IEEE 802.11 standard, the random channel access scheme utilized during the contention period 64 is referred to as a CSMA/CA operable pursuant to a distributed coordination function (DCF). Successive ones of the contention period 64 are interspersed with a contention free period 62 and, in like manner, successive ones of the contention free period 62 are interspersed with contention periods.

The contention free period 62 is here shown to include a beacon packet 66 and a plurality of data frames 68 positioned subsequent thereto. The contention free period is defined in a manner such that acknowledgment information acknowledging arrival of previously-transmitted frames of data are added to a succeeding frame in a piggy-back manner. The frame 68 identified by D1 is the left-most (as shown) frame of data. The next frame identified by U1 contains an acknowledgment indication ACK. Successive frames 68, i.e., frames D2 and U2 similarly include acknowledgment indications ACK acknowledging previously transmitted data. When different ones of the mobile terminals are operated at different transmission rates, detection of an acknowledgment indication might be missed if the data frame 68 containing the acknowledgment indication is transmitted at a higher bit rate than the previous one. Here, for instance, acknowledgment of the previous frame U1 might be sent at a higher bit rate than the data transmitted in the frame D1. The mobile terminal with which the frame D1 was communicated might not be able to detect the acknowledgment indication piggy-backed to the U1 frame.

The beacon 66 is first transmitted to initiate the CFP 62. Then the frame 68 identified by "D1+POLL" is sent. D1 refers to data which had not been sent during a previous CFP and has been maintained by the access point for transmission during the current CFP. The mobile terminal, e.g., 12-1 of FIG. 1, which receives the frame is polled by the POLL portion as to whether data is to be communicated therefrom.

Here, there is data to be communicated by the mobile terminal 12-1, namely, e.g., to the terminal 12-2. So, the frame 68, identified by "U1+ACK" is sent. The ACK is the acknowledgment of the terminal 12-1 that the prior frame had been received, and the U1 portion is the data to be communicated to the terminal 12-2.

The frame 68 identified by "D2+ACK+POLL" is sent by the access point to the mobile terminal 12-2. The data D2 corresponds to the data U1, as the access point is merely forwarding the data to the terminal 12-2. The ACK is the acknowledgment of receipt of the U1 data. And the POLL portion polls the terminal 12-2 whether or not data is to be communicated therefrom. The frame 68 identified by "U2+ACK" includes uplink data U2 and an acknowledgment of the receipt of the D2 data.

FIG. 3 again illustrates an exemplary data sequence forming a portion of a contention free period 62. Again, the contention free period includes a beacon packet 66 and a plurality of data frames 68. The top-most (as shown) CFP illustrates data frames and their respective transmission rates in the absence of sequence selection by the sequence selector 44 of an embodiment of the present invention. Here, different mobile terminals are operable at different transmission rates, here, at 1, 2, 5.5, and 11 Mb/s, arranged in a random sequence. The bottom-most (as shown) CFP 62 represents the same frame but subsequent to operation of the sequence selector 44 to arrange sequencing of the communication of the frames of data. As shown, frames which are to be transmitted at a higher bit rate are selected to be sequenced prior to the frames which are to be transmitted at a lower transmission rate.

Comparison of the top and bottom (as shown) CFPs 62, indicates that, without sorting and sequencing of the frames, the order of the frames is mixed. For instance, even if the frame 68 identified by B contains an acknowledgment of the frame 68 identified by A the mobile terminal which sends the frame A might not be capable of properly detecting the frame B and the acknowledgment indication piggy-backed thereto.

Through operation of an embodiment of the present invention, the access point 14 sorts all of the data which is to be transmitted in a CFP in descending order by transmission rates, prior to transmitting a beacon packet initiating the CFP. Sequence selection is performed by sorting terminal information, such as AID, in the polling list 46 implemented at the access point.

Figure 4:
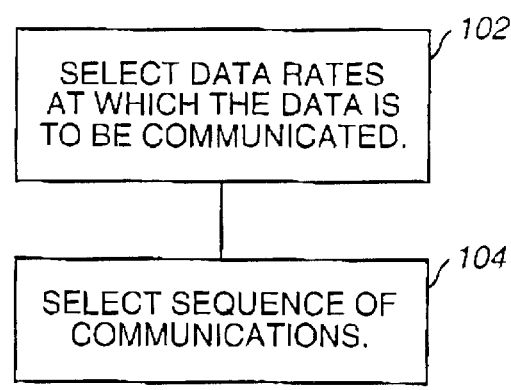
FIG. 4 illustrates a method flow diagram listing the method of operation of an embodiment of the present invention.

FIG. 4 illustrates a method flow diagram, shown generally at 98, of an embodiment of the present invention. The method is operable to control a communication sequence of communication of data with a first mobile terminal and at least a second mobile terminal. First, and as indicated by the block 102, the data rates at which data is selected to be communicated between network infrastructure in each of the first and at least second mobile terminals is detected. Then, and as indicated by the block 104, a communication sequence of the communication of the data is selected according to a sequencing scheme. The sequencing scheme orders the sequence of the communication of the data responsive to the transmission rates at which the data is selected to be communicated between the network infrastructure and each of the mobile terminals.

Thereby, a manner is provided for a multi-user, multi-rate communication system to ensure that acknowledgment indications generated to acknowledge receipt of a previously-transmitted group of data are detectable.

The previous descriptions are of preferred examples for implementing the invention, and the scope of the invention should not necessarily be limited by this description. The scope of the present invention is defined by the following claims:

We claim:

1. In a radio communication system having a network infrastructure with which a first mobile station and at least a second mobile station communicates data frames during a non-random access period, data frames to be communicated between the network infrastructure and the first mobile station selected to be communicated at a first data rate and data frames to be communicated between the network infrastructure and the second mobile station selected to be communicated at least at a second data rate, an improvement of a system for controlling a communication sequence of communication of the data with the first mobile station and the at least the second mobile station, respectively, said system comprising:

a selector coupled to receive indications of the first data rate and of the at least the second data rate at which the data is selected to be communicated between the network infrastructure and the first mobile terminal and between the network infrastructure and the at least the second mobile terminal, respectively, said selector for selecting the communication sequence of the communication of the data frames according to a sequencing scheme, the sequencing scheme ordering the sequence of the communication of the data frames into an ordered sequence of dataframe transmissions in which transmission of the data frames are sequenced according to which of the first and at least second data rates, respectively, are higher, such that data frames of the ordered sequence of higher data rates are selected to be transmitted during the non-random access period prior to data frames of lower data rates.

2. The system of claim 1 wherein data frames communicated by the network infrastructure to the first mobile station and data frames communicated by the network infrastructure to the second mobile station is communicated upon a forward link and wherein said selector is coupled to receive indications of the data rates at which the data frames are to be communicated upon the forward link to the first mobile station and to the second mobile station, respectively.

3. The system of claim 1 wherein data frames communicated by the first mobile station to the network infrastructure and data frames communicated by the second mobile station to the network infrastructure is communicated upon a reverse link and wherein said selector is coupled to receive indications of the data rates at which the data frames are to be communicated upon the reverse link to the first mobile station and to the second mobile station, respectively.

4. The system of claim 1 wherein the network infrastructure includes an access point and wherein said selector forms a portion of the access point.

5. The system of claim 4, wherein the access point further comprises a point coordinator function forming a polling master for polling each of the first mobile station and the at least second mobile station to determine whether data frames are to be communicated therewith and the rates at which the data frames are to be communicated and wherein the indications of the data rates to which said selector is coupled to receive are formed by the polling master.

6. The system of claim 1 wherein the radio communication system comprises a WLAN (wireless local area network), wherein the non-random access period forms a form contention free period (CFP) and wherein said selector selects sequencing of data frames during the contention free period.

7. The system of claim 6 wherein the radio communication system further utilizes acknowledgment feedback that acknowledges reception of a data frame and wherein the acknowledgment feedback is communicated together with a subsequently-transmitted data frame.

8. In a method for communicating in a radio communication system having network infrastructure with which a first mobile station and at least a second mobile station communicates data frames during a non-random access period, the data frames to be communicated between the network infrastructure and the first mobile station selected to be communicated at a first data rate and the data frames to be communicated between the network infrastructure and the at least the second mobile station selected to be communicated at least at a second data rate, an improvement of a method for controlling a communication sequence of communication of the data with the first mobile station and the at least second mobile station, respectively, said method comprising:

identifying data rates at which data frames are selected to be communicated between the network infrastructure and each of the first and at least second mobile stations, respectively; and selecting the communication sequence of the communication of the data frames according to a sequencing scheme, the sequencing scheme ordering the sequence of the communication of the data frames into an ordered sequence of data-frame transmissions in which transmission of the data frames are sequenced according to which of the first and at least second data rates, respectively, are higher, such that data frames of the ordered sequence of higher data rates are selected to be transmitted during the non-random access period prior to data frames of lower data rates.

9. The method of claim 8 wherein the network infrastructure includes an access point and wherein said operations of identifying and selecting are performed at a selected one of the access point and the first and second mobile stations, respectively.

10. The method of claim 8 comprising the additional operation of polling each of the first mobile station and the at least second mobile station to determine whether data frames are to be communicated therewith and the transmission rates at which the data frames are to be communicated.

11. In an access point of a WLAN (wireless local area network) providing for wireless communication of a first data frame pursuant to a first communication session with a first mobile station and at least a second data frame pursuant to a second communication session with at least a second mobile station, an improvement of apparatus for controlling sequencing of communication at the first data frame and the at least second data frame within a selected non-random access time period, said apparatus comprising:

a selector coupled to receive indications of a first data rate at which the first data frame is to be communicated and of at least a second data rate at which the at least the second data frame is to be communication, said selector for selecting the sequencing of the communication of the first data frame and the at least second data frame according to a sequencing scheme, the sequencing scheme ordering the sequence of the communication of the data frames into an ordered sequence of data-frame transmission sin which transmission of the data frames are sequenced according to which of the first and at least second data rates, respectively, are higher, such that data frames of the ordered sequence of higher data rates are selected to be transmitted during the non-random access period prior to data frames of lower data rates.

12. Apparatus for controlling a communication sequence of communication of data frames during a non-random access time period with a first mobile station and at least a second mobile station operable in a radio communication system having a network infrastructure with which the first mobile station and the at least the second mobile station communicates data frames in which reception of data frames is acknowledged by an acknowledgment feedback indication, the data frames to be communicated between the network infrastructure and the first mobile station selected to be communicated at a first data rate and the data to be communicated between the network infrastructure and the at least second mobile station selected to be communicated at least at a second data rate, said apparatus comprising:

a selector coupled to receive indications of the first data rate and of the at least the second data rate at which the data frames are selected to be communicated between the network infrastructure and the first mobile terminal and between the network infrastructure and the at least the second mobile terminal, respectively, said selector for selecting the communication sequence of the communication of the data frames according to a sequencing scheme, the sequencing scheme ordering the sequence of the communication of the data frames into an ordered sequence of data frame transmissions in which transmission of the data frames are sequenced according to which of the first and at least second data rates, respectively, are higher, such that data frames of the ordered sequence of higher data rates are selected to be transmitted during the non-random access period prior to data frames of lower data rates.

13. The apparatus of claim 12 wherein data frames communicated by the network infrastructure to the first mobile station and data frames communicated by the network infrastructure to the second mobile station are communicated upon a forward link and wherein said selector is coupled to receive indications of the data rates at which the data frames are to be communicated upon the forward link to the first mobile station and to the second mobile station, respectively.

14. The apparatus of claim 12 wherein data frames communicated by the first mobile station to the network infrastructure and data frames communicated by the second mobile station to the network infrastructure are communicated upon a reverse link and wherein said selector is coupled to receive indications of the data rates at which the data frames are to be communicated upon the reverse link to the first mobile station and to the second mobile station, respectively.

15. The apparatus of claim 12 wherein the network infrastructure includes an access point and wherein said selector forms a portion of the access point.

16. The apparatus of claim 12 wherein the access point further comprises a point coordinator function forming a polling master for polling each of the first mobile station and the at least second mobile station to determine whether data frames are to be communicated therewith and the rates at which the data frames are to be communicated and wherein the indications of the data rates to which said selector is coupled to receive are formed by the polling master.

17. The apparatus of claim 16 wherein the radio communication system comprises a WLAN (wireless local area network), wherein the non-random access period forms a contention free period (CPF) and wherein said selector selects sequencing of data frames during the contention free period.

18. The apparatus of claim 17 wherein acknowledgment feedback acknowledges reception of a data frame and wherein the acknowledgment feedback is communicated together with a subsequently-transmitted data frame.

* * * * *